United States Patent [19]  [11] 3,798,875
Morris  [45] Mar. 26, 1974

[54] RECOVERY OF HYDROGEN FLUORIDE

[75] Inventor: George Oswald Morris, Runcorn, England

[73] Assignee: Imperial Chemical Industries, Limited, London, England

[22] Filed: Feb. 22, 1972

[21] Appl. No.: 228,109

[52] U.S. Cl............ 55/22, 55/71, 423/240, 423/483, 423/485
[51] Int. Cl............................................. B01d 47/00
[58] Field of Search ............ 55/22, 56, 71, 74; 423/240, 483–485

[56] References Cited
UNITED STATES PATENTS
2,426,558  8/1947  Long et al............................ 55/71 X
2,858,901  11/1958  Fort, Jr.................................. 55/22

Primary Examiner—Samih N. Zaharna
Assistant Examiner—Richard W. Burks
Attorney, Agent, or Firm—Cushman, Darby & Cushman

[57] ABSTRACT

Hydrogen fluoride is recovered from a gaseous mixture containing it by passing the gaseous mixture through a mixture of an alkali-metal fluoride in an inert liquid maintained at a temperature at which the hydrogen fluoride is absorbed and thereafter heating the mixture to a temperature sufficient to liberate hydrogen fluoride.

16 Claims, 1 Drawing Figure 3,798,875
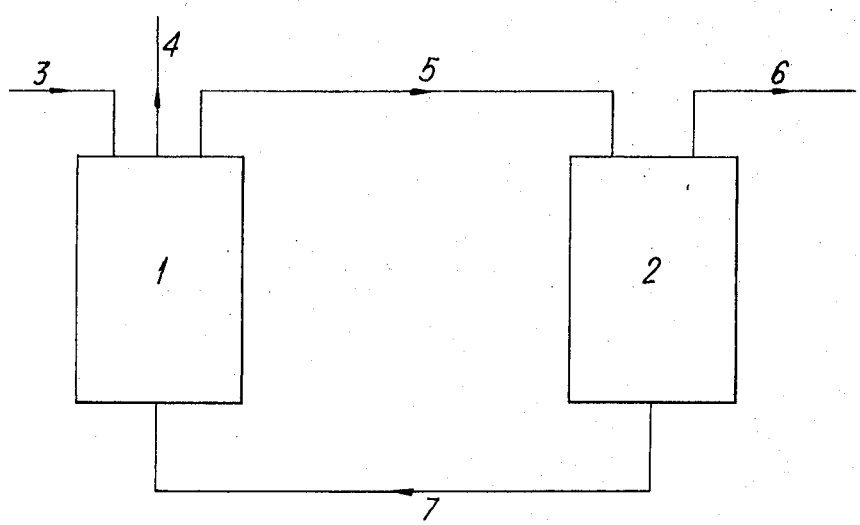

RECOVERY OF HYDROGEN FLUORIDE

This invention relates to a process for the recovery of hydrogen fluoride, and especially for the production of substantially dry hydrogen fluoride from aqueous mixtures.

In a number of processes in which hydrogen fluoride is produced or used, hydrogen fluoride is obtained in the form of a dilute gaseous mixture or is contaminated with water Separation of hydrogen fluoride from water is made especially difficult by the fact that these two components form an azeotrope, and so cannot be separated readily by simple distillation. It is therefore desirable to have an effective method for recovering hydrogen fluoride and especially for recovering it in a substantially anhydrous condition from aqueous mixtures.

It is known that hydrogen fluoride can be absorbed by solid sodium fluoride and can subsequently be recovered from it by heating, but this method presents great difficulties in practice; for example heat transfer problems make it necessary for the apparatus to be bulky and the breakdown of the solid absorbent (caused by expansion and contraction during the process) results in pressure build-up in the apparatus.

We have now found that these disadvantages may be obviated by using the absorbing solid in an inert liquid.

Thus according to the present invention we provide a process for the recovery of hydrogen fluoride from a gaseous mixture containing it which comprises passing the said gaseous mixture through a mixture of an alkali-metal fluoride in an inert liquid maintained at a temperature at which the hydrogen fluoride is absorbed and thereafter heating the mixture to a temperature sufficient to liberate hydrogen fluoride.

The alkali-metal fluoride is preferably sodium fluoride, but other alkali-metal fluorides or mixtures thereof may be used if desired.

The alkali-metal fluoride is usually used in the form of a suspension in the inert liquid and may be suspended in the liquid by any convenient means, for example by mechanical stirring, but adequate suspension may be achieved in some cases by the flow of the gaseous mixture through the suspension. The particle size of the alkali-metal fluoride is not critical, and may be chosen to achieve the desired degree of suspension in the system concerned.

The liquid may be any which is substantially inert under the conditions of use. Thus is should not be decomposed by contact with the hydrogen fluoride or the alkali metal fluoride or react to any substantial extent with either of them, and it should not be decomposed appreciably at the temperature of use. Preferably it is one which has a boiling point of at least 250°C and, conveniently, it is one which is substantially immiscible with water. It is also desirable that the liquid is one which can dissolve hydrogen fluoride, even if only to a limited extent, and it is one which does not appreciably dissolve the alkali-metal fluoride.

Examples of suitable liquids include high-boiling aromatic compounds, for example diphenyl, diphenyl ether and mixtures of these, especially the eutectic mixture, and halogenated aromatic compounds, for example chlorinated diphenyl; esters, for example the phthalate esters, and in particular di-n-butyl phthalate; polyglycols for example those having a molecular weight of at least 1,000, for example polypropylene glycol; mineral oils; long-chain carboxylic acids, for example oleic acid; and mixtures of such liquids.

The concentration of the alkali-metal fluoride in the liquid is not critical and may vary over a wide range for example between 1 and 50 percent by weight, preferably between 15 and 25 percent by weight, of alkali-metal fluoride in the mixture.

The absorption is generally carried out at a temperature in the range of 70°–180°C, and preferably in the range 110°–130°C. The further heating to liberate hydrogen fluoride, is preferably carried out at a temperature about 180°C, for example in the range 240°–280°C.

The process of our present invention may be applied to the recovery of hydrogen fluoride from a wide range of gaseous mixtures. Thus it may be used to recover hydrogen fluoride from mixtures in which the hydrogen fluoride content may vary as widely as, for example, from 2 to 98 percent by weight, and the undesired component of the gas mixture may include for example one or more of nitrogen, oxygen, water-vapour, organic vapours, oxides of carbon and other acidic gases, for example sulphur dioxide, hydrogen sulphide, silicon tetrafluoride and hydrogen chloride. The undesired components of the gaseous mixture pass on unabsorbed, and accordingly the temperature used for the absorption stage should be selected to minimise or avoid condensation of such components, for example steam. The process is especially useful for the recovery of hydrogen fluoride from mixtures containing water.

The process of the present invention may be applied to the recovery of hydrogen fluoride from the crude reaction vapours obtained for example in the pyrohydrolysis of fluorspar (calcium fluoride). Since the process of the invention is highly efficient in separating hydrogen fluoride from a large variety of gases, the invention is particularly applicable in separating hydrogen fluoride from the vapours obtained by pyrohydrolysis of crude fluorspar and/or low grade fluorspar.

Thus hydrogen fluoride may be obtained by pyrohydrolysis or other treatment of fluorspar varying in quality from crude ore as mined, which may contain as little as 20 percent by weight of calcium fluoride, through concentrated low grade ores to high grade concentrate containing at least 97 percent by weight of calcium fluoride.

Typical impurities in the fluorspar include silica, alumina, barytes and heavy metal carbonates and sulphides. Thus one of the major contaminant gases from which the hydrogen fluoride is to be separated, may be sulphur dioxide which is obtained, for instance by decomposition of the barytes or oxidation of the sulphides.

The process of the invention may also be applied to recovering hydrogen fluoride obtained by pyrohydrolysis of fluorosilicic acid or its salts, e.g., calcium fluorosilicate, which salts may optionally be mixed with a silicate, e.g., calcium silicate. The process of the invention may also be applied to the recovery of hydrogen fluoride obtained as a by-product in other chemical reactions, or where it is recovered in reactions when it is used as a starting material, for instance in the fluorination of chlorinated hydrocarbons. It may also be recovered from aqueous solution, for example the aqueous condensates obtained from any of the above processes. If desired it may be applied to recover anhydrous hydrogen fluoride from the aqueous constant boiling acid, which contains about 38 percent of hydrogen fluoride.

The gaseous product containing hydrogen fluoride which is obtained as a result of the second heating stage of the process of the invention may be treated in conventional manner to recover the hydrogen fluoride therefrom. For example it may be cooled to a temperature below 19.5°C to condense the hydrogen fluoride or the gaseous stream of hydrogen fluoride may be used directly for any desired chemical reaction without intermediate isolation.

The process may be operated in batchwise or continuous manner, but is especially useful for continuous operation.

The accompanying drawing is a schematic representation of a process according to the present invention, adapted for continuous operation. A gaseous stream containing hydrogen fluoride enters along channel (3) into a reactor (1) which contains a slurry of alkali-metal fluoride in an inert liquid maintained at the absorption temperature, for example about 120°C, and unabsorbed gases leave the reactor along channel (4). The slurry of alkali-metal fluoride containing absorbed hydrogen fluoride is passed along channel (5) to the reactor (2) where it is heated to the evolution temperature, for example about 260°C; dry hydrogen fluoride is thus liberated and leaves along channel (6). The residual slurry is then returned to reactor (1) along channel (7) for re-cycle through the process.

The invention is further illustrated in the following Example.

EXAMPLE

Gaseous mixtures of steam, hydrogen fluoride and nitrogen were passed into a slurry comprising 55g of sodium fluoride in 188g of inert liquid maintained at 110°–120°C. The slurry was analysed to determine how much hydrogen fluoride had been absorbed.

The slurry was then heated to 260°C over a period of 2 hours and the weight of hydrogen fluoride liberated was measured.

The results are shown in the following Table.

TABLE

| Liquid in which NaF is dispersed | Inlet Gas Composition (% w/w) | | | HF absorbed (%) | HF recovered (% of Hf absorbed) |
| --- | --- | --- | --- | --- | --- |
| | steam | HF | Nitrogen | | |
| Diphenyl/Diphenyl ether eutectic mixture | 23.1 | 5.2 | 71.7 | 56.0 | 91.5 |
| Di-n-butyl phthalate | 23.0 | 6.0 | 71.0 | 83.3 | 93.6 |
| - Ditto - | 21.9 | 7.1 | 61.0 | 93.1 | 89.6 |
| Polypropylene glycol (M.W. 2025) | 23.3 | 6.1 | 70.6 | 87.6 | 74.0 |

What we claim is:

1. A process for the recovery of hydrogen fluoride from a gaseous mixture containing it which comprises (i) passing the said gaseous mixture through a suspension of an alkali-metal fluoride in an inert liquid having a boiling point of at least 250°C, the said suspension being maintained at a temperature below 180°C, and at a temperature at which the hydrogen fluoride is absorbed by the said suspension, (ii) heating the said suspension to a temperature above 180°C, whereby hydrogen fluoride is liberated from the said suspension and the said suspension is regenerated.

2. A process according to claim 1 wherein the process is carried out continuously and the gaseous mixture is passed to the suspension in a first stage where the gaseous mixture is absorbed by the suspension, the suspension of the first stage is heated in a second stage to liberate the hydrogen fluoride and regenerate the suspension and the regenerated suspension is recycled to the first stage.

3. A process according to claim 1 in which the alkali-metal fluoride is sodium fluoride.

4. A process according to claim 1 in which the alkali-metal fluoride comprises 1 to 50 percent by weight of the mixture with the liquid.

5. A process according to claim 4 in which the alkali-metal fluoride comprises 15 to 25 percent by weight of the mixture.

6. A process according to claim 1 in which the mixture is maintained at a temperature of 70° to 180°C whilst the hydrogen fluoride is absorbed.

7. A process according to claim 6 in which the temperature is 110° to 130°C.

8. A process according to claim 1 in which the mixture has been heated to a temperature of 240° to 280°C to liberate the hydrogen fluoride.

9. A process according to claim 1 in which the hydrogen fluoride is recovered from a gaseous mixture containing water.

10. A process according to claim 9 in which the gaseous mixture is obtained by the pyrohydrolysis of fluorspar.

11. A process according to claim 1 in which the liquid with which the alkali-metal fluoride is mixed is one which does not appreciably dissolve the alkali-metal fluoride.

12. A process according to claim 1 in which the liquid with which the alkali metal fluoride is mixed is one which is substantially immiscible with water.

13. A process according to claim 1 in which the liquid with which the alkali-metal fluoride is mixed is a high-boiling aromatic compound.

14. A process according to claim 13 in which the liquid is diphenyl, diphenyl ether or a mixture of these.

15. A process according to claim 13 in which the liquid is chlorinated diphenyl.

16. A process according to claim 1 in which the liquid with which the alkali-metal fluoride is mixed is di-n-butyl phthalate, polypropylene glycol, mineral oil, oleic acid or a mixture of two or more of these.

* * * * *

UNITED STATES PATENT OFFICE
CERTIFICATE OF CORRECTION

Patent No. 3,798,875        Dated March 26, 1974

Inventor(s) George Oswald Morris

It is certified that error appears in the above-identified patent and that said Letters Patent are hereby corrected as shown below:

Please add the following to the front page format after the application number:

[30] Foreign Application Priority Data

March 8, 1971     Great Britain         6269/71

Signed and sealed this 10th day of September 1974.

(SEAL)
Attest:

McCOY M. GIBSON, JR.              C. MARSHALL DANN
Attesting Officer                  Commissioner of Patents